United States Patent [19]
Howden

[11] 4,367,014
[45] Jan. 4, 1983

[54] POLYGONAL ROTARY SCANNERS

[75] Inventor: Harry Howden, Smallfield, England

[73] Assignee: U.S. Philips Corporation, New York, N.Y.

[21] Appl. No.: 214,594

[22] Filed: Dec. 8, 1980

[30] Foreign Application Priority Data

Dec. 13, 1979 [GB] United Kingdom ............... 7942998

[51] Int. Cl.³ .................... G02B 5/08; B29D 11/00
[52] U.S. Cl. ................... 350/320; 350/299;
249/93; 425/808; 425/123; 425/120; 264/1.1;
156/330; 156/295; 156/307.3; 156/239;
156/241; 156/233
[58] Field of Search ............. 350/320, 299, 6.7, 6.8;
156/239, 295, 330, 233, 241, 307.3; 425/123,
120, 127; 264/1.1, 263, 264; 249/93, 91, 83

[56] References Cited
U.S. PATENT DOCUMENTS

| 4,093,350 | 6/1978 | Fisli ................... 350/299 |
| 4,101,365 | 7/1978 | Fisli ................... 156/294 |
| 4,277,141 | 7/1981 | Kleiber ................ 350/320 |

FOREIGN PATENT DOCUMENTS

54-7943 1/1979 Japan .................. 350/299
340002 1/1931 United Kingdom .

*Primary Examiner*—Jon W. Henry
*Attorney, Agent, or Firm*—Marc D. Schechter

[57] ABSTRACT

A polygonally shaped, multifaceted rotary scanner comprising a plurality of optically flat, reflective surfaces on the facets. The reflective surfaces are integrally bonded to a multifaceted, polygonal base at precise angles to the axis of rotation by a replication technique in which each optically flat reflective surface is produced on the surface of a flat master preform, and the flat master preform is then accurately located in position at the precise angle relative to the base by contact with upper and lower facets of a master multifaceted polygonal fixture. The flat reflective surface is then adhesively bonded to the corresponding facet of the polygonal base (while the polygonal base is arranged concentrically between the upper and lower facets of the fixture) by the application of a small quantity of a liquid adhesive to the surface of the facet of the polygonal base. On hardening, the adhesive bonds the reflective layer of each master preform to the appropriate facet of the polygonal base.

6 Claims, 4 Drawing Figures

POLYGONAL ROTARY SCANNERS

BACKGROUND OF THE INVENTION

This invention relates to a method of manufacturing polygonally shaped, multifaceted rotary scanners by replication and to multifaceted polygonally shaped scanners manufactured by the method.

In particular, this invention relates to a method of manufacturing polygonally shaped, multifaceted rotary scanners of the kind which comprise a plurality of optically flat, reflective surfaces integrally mounted at precise angles to the axis of rotation on a multifaceted polygonal base.

Multifaceted polygonal scanners can be employed in a wide range of applications, typically for the accurate reflection of light or other electromagnetic radiation, such as thermal radiation, from a radiation source for passage along a narrow path of a radiation sensor remote from the radiation source.

The angle at which each radiation reflective facet of the multifaceted polygonal scanner is set is subject to misalignment during manufacture and when the scanner is in use. The angle of each reflective facet is known to be critical because it determines the direction of the reflected radiation and the duration of the scan relative to the angular velocity of the rotating scanner. The relative angles at which the radiation reflective facets are set to each other also must be constant even when the scanner is subjected to large induced stresses due to high speed rotation when the scanner is in use.

From U.S. Pat. No. 4,093,350, it is known to produce high speed, multifaceted polygonal scanners by a replication technique.

In the aforesaid U.S. patent, there is described a process which uses a multifaceted polygonal master form, the inner periphery of which comprises a plurality of facet-shaped members. An aluminium preform is positioned concentrically within the master, and an epoxy is centrifugally cast against the aluminum preform in a replication process to provide the multifaceted polygonal scanner. The cast epoxy conforms to the shape of the faceted master.

The epoxy is required in U.S. Pat. No. 4,093,350 to be cast by centrifugal dispersion into a single, circumferential gap, in a one stage operation while the master form is rotated on a vertical axis. The gap is positioned between the inner periphery of the master form and the outer periphery of the preform comprising the facet-shaped members. Dispersion of the epoxy is induced by the centrifugal casting and continues until the gap is filled with a thin film of bubble free liquid epoxy.

It is furthermore stated in their patent, that in prior art replication techniques the production of large optical surfaces has been contemplated so that the application of a thin plastic film to the preform is found to be relatively easy. However, the ease of accessibility of these surfaces unfortunately does not always ensure a bubble-free plastic layer. The thicknesses of these layers may be, for example, approximately 0.005 inches, so that to fill the narrow cavity between the master form and the polygonal preform without introducing of air bubbles is extremely difficult, if not impossible. Thus, such thin films of liquid resin are cast by centrifugal means in the one stage operation.

The bubble-free epoxy film is next cured. The master form, however, then has to be removed without damaging either the preform or the master (which is required for subsequent use). The preform is removed by a pushing action, or as illustrated by FIG. 1 of the aforesaid U.S. patent, by the use of screws which apply pressures at various disengagement points. It is clear that great care must be exercised if damage and distortion are to be avoided, and this can be both time consuming and expensive, particularly when surplus resin becomes firmly set onto variously angled nonpolished surfaces of the master form.

The aforesaid process furthermore does not lend itself to a cheap, simple manufacture of a multifaceted preform, the surfaces of which are accurately produced for concentric positioning within the accurately produced master. Coating the surfaces of a plurality of facets with a single layer of gold may also be difficult to effect and expensive in material particularly if various surfaces are almost inaccessible. On removal by breaking the master away from the preform, the gold layer so produced must separate from the surface of each facet of the master form while remaining adhesively bonded to the hardened epoxy. Good separation obviously becomes increasingly difficult with an increase in the number of facets on the faceted master and with an increase in the changes of the angles of the facets.

SUMMARY OF THE INVENTION

One object of the present invention is to provide a method of manufacturing a polygonally shaped multifaceted rotary scanner in which one master preform is used for producing each facet of the multifaceted scanner and which can be individually set by a bubble free adhesive layer of resin at a required precise angle in an easy and simple manner.

Another object of the invention is to provide a method in which a plurality of master preforms are separately produced, and wherein the master preforms may each be identical or different. The master preforms are also preferably produced by replication techniques and in sufficiently large numbers so that they can replace master preforms which have become damaged in use or so that they, for example, previously used preforms can be recoated with a further reflective layer while resin in contact with other preforms is hardening. The master preform furthermore may be easily coated with a parting layer for each subsequent use in the method. Each master preform may be simply manufactured to a first order of accuracy for the required profile and the surface finished by known techniques. Such techniques include mass production methods for casting, machining grinding and/or polishing the surfaces of the master preform and also, if desired, hand-figuring and polishing techniques as used for producing surfaces for astronomical optical applications. Removal of a parting layer from the surface of a highly polished, comparatively small flat surface is therefore facilitated.

According to one aspect of the present invention, there is provided a method of manufacturing a polygonally shaped, multifaceted rotary scanner by replication. Each rotary scanner comprises a plurality of optically flat, reflective surfaces integrally bonded to a multifaceted polygonal base at precise angles to the axis of rotation of the base. According to the invention, a plurality of optically flat reflective surfaces are prepared by coating each optically flat surface of a corresponding number of flat, master preforms with the respective reflective layer and locating the reflective surface with its flat master preform at the required angle by locating means comprising upper and lower facet members of a master, multifaceted polygonal fixture. Each reflective surface is positioned, in a plane formed by an adjacent pair of upper and lower facet members, above a corresponding facet of the multifaceted polygonal base. The base has previously been concentrically mounted between the plurality of upper and lower facet members of the fixture. Each reflective surface is bonded to the underlying corresponding facet of the polygonal base by displacement on contact with a resin in liquid form. After the resin hardens, the flat master preforms and removed from the polygonal fixture to leave the reflective layers integrally bonded to the respective facets of the polygonal base. The master preforms can be recoated with further respective reflective parting layers can then be used for replicating additional polygonal scanners by the above method.

In one embodiment the plurality of flat master preforms each comprise an optically polished, flat glass substrate which is coated on the polished surface with a parting layer, the outermost surface of which comprises a radiation reflective layer. The parting layer may comprise a reflective layer of gold on the polished glass surface on the surface of which there is a layer of platinium followed by a layer of nickel. The multifaceted polygonal base may have a plurality of flat surfaces which are produced by casting and/or machining so that each surface is set substantially at the required angle and with a substantially flat surface, the angle and the surface finish being to a second order of profile accuracy and surface finish when compared with highly accurate profiles produced by known techniques for hand figured optical profiles. Preferably the surfaces are substantially flat and are machined from a blank of metal such as aluminum to form the polygonal base. The base may be in the form of a regular octahedron although 6, 7 or 9 to 14 facet surfaces may be equally satisfactory.

The multifaceted polygonal base is concentrically positioned between the upper and lower facet portions of the master fixture by removing an upper part of master fixture and placing the base member therebetween so that a substantially flat surface is formed. The flat surface may be in a plane which is stepped just below the plane produced by the associated upper and lower facet members of the polygonal fixture when the flat master preform and the polygonal base are assembled in position between the facets of the fixture.

In another embodiment when the master preform is removably assembled in position the gap produced by the stepped flat surfaces of the multifaceted polygonal base is from 0.5 mm to 0.15 mm, the gap being sufficient to take up the differences in the angles between each substantially flat surface of the polygonal base and the respective required angles as determined by the upper and lower facet members of the fixture.

Each gap may be identical in depth and is preferably 0.10 mm. The surface of each master preform is coated with a parting layer (at least on the optically polished surface of the preform). The parting layer preferably comprises a thin layer of gold on which, if desired, there is deposited a thin layer of platinium and further if desired a thin layer of nickel. The gold may be deposited by vapor deposition and the platinium and/or nickel deposited by electrodeposition. On separation from the master preform the gold layer in this embodiment then becomes the outermost layer and the reflective surface for the appropriate facet of the polygonal scanner.

Other noncorrosive, specularly reflective metals, such as, tin, aluminium or copper are also suitable.

On assembly the space between the surface of each facet of the base and the respective parting layer is filled by the resin in liquid form, the liquid resin being displaced on contact with the parting layer. The space or gap may be filled by a liquid thermosetting resin which is hardened by heat. Liquid self polymerising resins are particularly satisfactory, that is, liquid resins which self harden and to which hardeners, accelerators, catalysts and/or fillers if desired are incorporated therein. Solvent based liquid resins are not particularly suitable because of a loss of volume (shrinkage) on hardening.

Particularly suitable resins are epoxy resins based on the reaction product of bisphenol A and epichlorhydrin and to which a hardener, if desired, is added. Such resins, in general, have a suitable viscosity to flow on contact in the liquid state, can be made to flow free from entrapped bubbles by displacement on contact with the reflective surface of the master preform and have a high structural strength when hardened. They also have a low coefficient of shrinkage on hardening and a low coefficient of thermal expansion over a useful working temperature range.

Other resins, such as, phenol formaldehyde, urea formaldehyde and liquid resol resins are also satisfactory. Cold setting resins however, are particularly satisfactory as the liquid resin can be applied as a pool of liquid resin on each facet surface of the base and can be allowed to harden separately, if desired, as the master preforms are positioned against the upper and lower facets of the master fixture member.

A rapid curing liquid resin, such as, polycyanacrylate or a copolymer thereof can be used particularly to set each master preform separately. Each master preform can be quickly positioned and it will set separately, the master preform again being accurately positioned by contact with a part of its face against the adjacent upper and lower facet portions of the master fixture member. Alternatively each master preform may be held against the upper and lower facet portion of the master fixture member by one or more spring clip members until the liquid resin is hardened. In one method in which spring clip members held the master fixture members until the resin was cured the liquid resin used is a thermosetting resin comprising an epoxy bisphenol A to which, a hardener was added. The liquid resin was applied to at least a part of the appropriate flat surface of the polygonal base, and the liquid resin was displaced to cover the flat surface and fill a gap formed by the surface being stepped below the plane of the upper and lower facet members. Excess liquid resin, was removed prior to allowing the resin to harden and prior to dismantling the assembly. No trapped air bubbles were present in the hardened resin.

The invention will now be further described with reference to the accompanying drawings.

DESCRIPTION OF THE PREFERRED EMBODIMENTS

Figure 1:
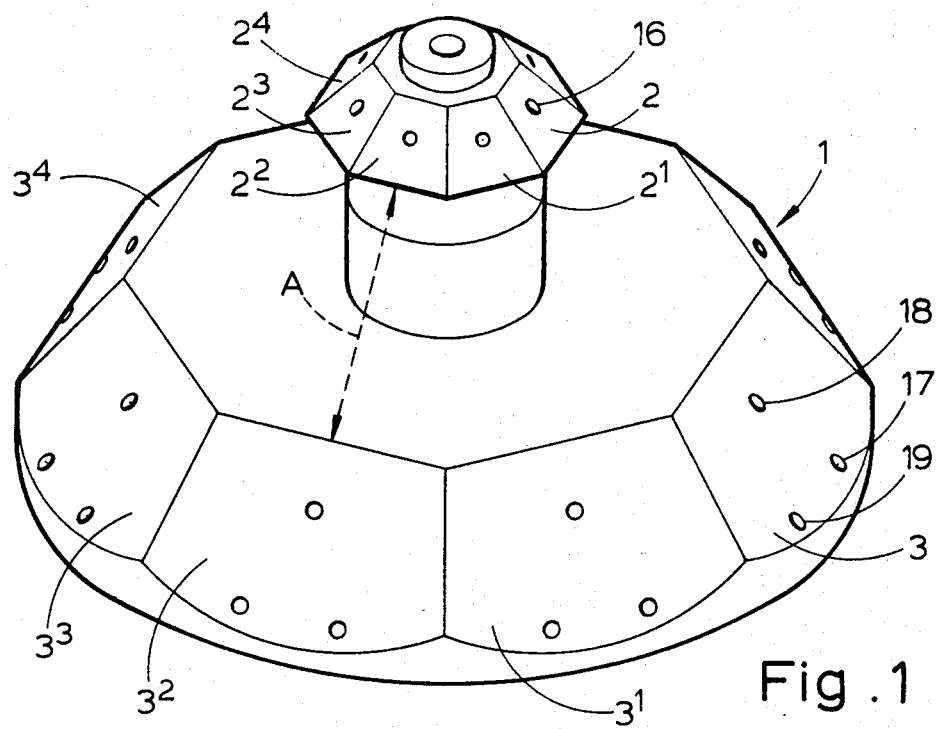
FIG. 1 is a perspective view of a multifaceted polygonal master fixture with a number of precisely angled upper and lower facet portions.

In FIG. 1 the multifaceted polygonal master fixture 1 is formed of cast aluminum and a number of precisely machined, pairs of angled upper and lower facet portions which are indicated by the numerals 2 and 3 ($2^1,3^1$, $2^2,3^2$, $2^3,3^3$ and $2^4,3^4$).

Figure 2:
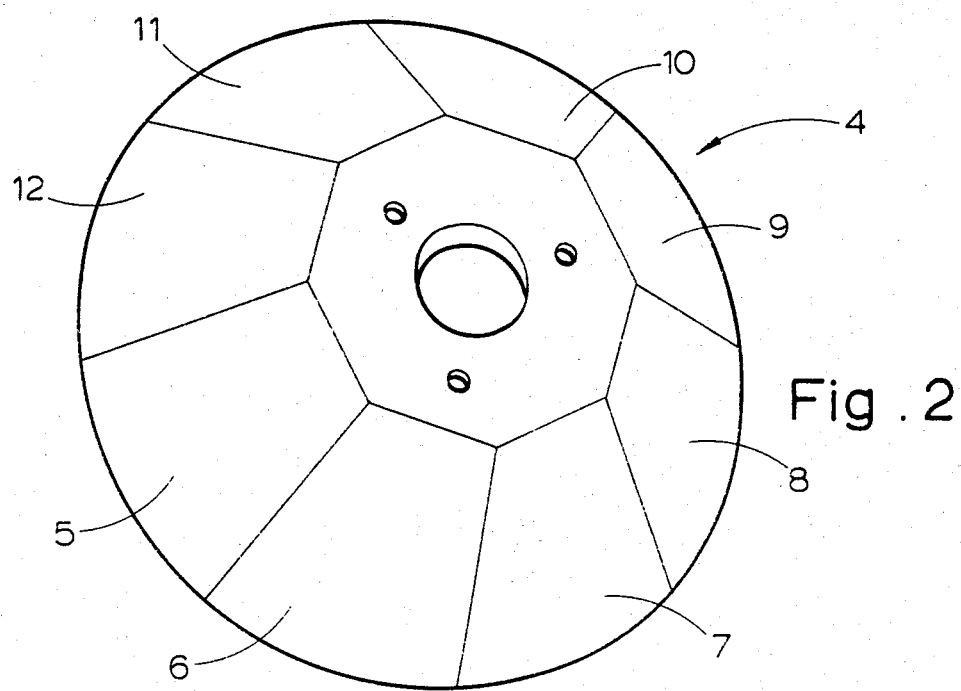
FIG. 2 is a perspective view of a multifaceted polygonal base which can be removably assembled concentrically between the upper and lower facet portions of the master fixture in the space indicated by the broken line A.

A multi-faceted polygonal base 4 (FIG. 2) is removably positioned concentrically with the fixture in the space indicated by the broken line A of FIG. 1 by removing the upper faceted portions 2,$2^1$, $2^2$, $2^3$ and $2^4$. The faces 5,6,7,8,9,10,11 and 12 of the polygonal base 4 are accurately positioned between the appropriate adjacent pairs of upper and lower facets of the fixture 1 so that a series of substantially flat surfaces are obtained.

The base 4 is preferably formed by machining a blank of aluminum and the surface faces 5,6,7,8,9,10,11 and 12 are prepared to a second order accuracy only.

Figure 3:
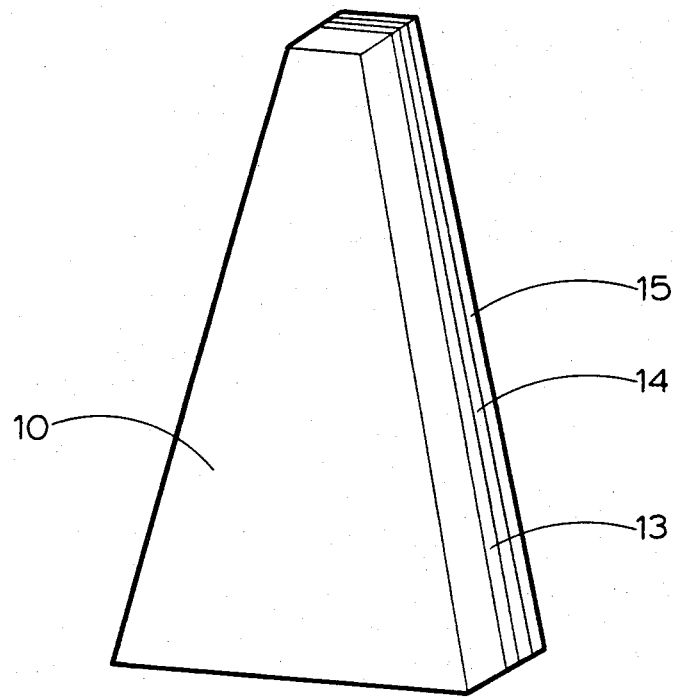
FIG. 3 is a perspective view of a master preform which is located in its position on the base by being removably attached to the upper and lower facets of the master fixture when the multifaceted polygonal base member is in the position indicated by the broken line A in FIG. 1.

A master preform 10 (FIG. 3) is one of a number of master preforms which are accurately prepared to a first order of accuracy for both the resultant profile and the optically polished surface. The optically polished surface is coated with a thin parting layer comprising a vapor deposited film of gold 13, electrodeposited platinium 14 and electrodeposited nickel 15.

Figure 4:
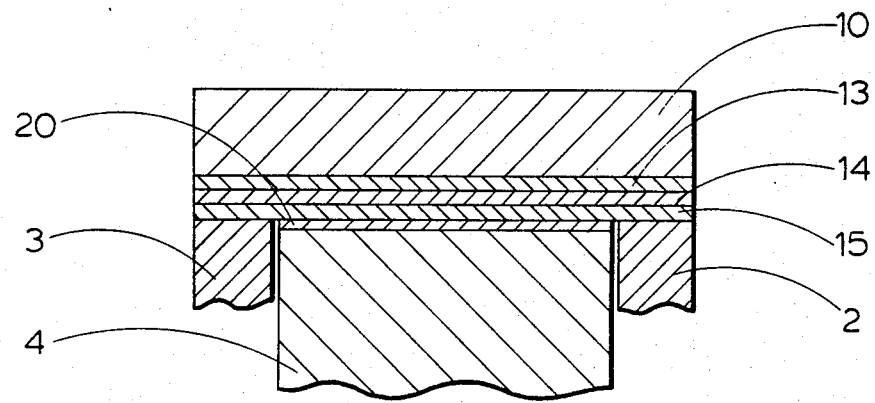
FIG. 4 is a cross-sectional view of one master preform in its assembled position with the polygonal base and an upper and a lower facet of the master fixture.

FIG. 4 illustrates a longitudinal cross section of one master preform 10 with a parting layer comprising gold 13, platinium 14 and nickel 15 coated on one surface. The parting layer is in contact with an upper 2 and a lower 3 facet of the fixture. A gap 20 is present between the nickel layer 15 and the adjacent flat surface of the multi-faceted polygonal base 4.

The polygonal base 4 when positioned between the upper and lower facet portions 2 and 3 was treated by placing three drops of a liquid epoxy resin on each facet surface. The drops of resin formed a small, stable pool of liquid resin on each surface. If necessary the fixture member 1 can be tilted to one side to keep the initial pool of liquid resin in the center of each facet. Each preform 10 was then placed with the nickel 15 face downwards so that on contact the pool of liquid resin was spread to fully cover a gap provided between the nickel layer 15 and the surfaces 6,7,8,9,10,11 or 12 of the base 4. Excess liquid resin was removed in each case by wiping with a cloth. The preforms 10 were each held in position, until the resin hardened, by spring clips (not shown) which were located at the attachment holes indicated by numerals 16, 17, 18 and 19 on the respective upper and lower facet portions 2 and 3.

A resin of 0.1 mm was left between layer 15 and the surface of base 4 of the substrate. When the resin was hardened the assembly was dismantled by removing each master preform 10 separately, followed by removing the upper part of the master fixture member and then removing the finished multifaceted polygonal scanner. The component parts were then re-assembled to form the master fixture 1 again and the master preforms 10 were recoated with further parting layer 13, 14 and 15. Another multi-faceted polygonal base 4, having surfaces prepared again to a second degree of accuracy, was then positioned in the fixture 1 and a further scanner was replicated as above. No obvious defects were noticeable between the first scanner produced and the second and further scanners produced by the same method in a production run.

I claim:

1. A method of manufacturing a polygonally shaped, multifaceted rotary scanner, said scanner comprising a multifaceted polygonal base having an axis of rotation and having optically flat, reflective surfaces integrally bonded to each facet of the base at precise angles relative to the axis of rotation, characterized in that the method comprises the steps of:

providing at least one master preform having an optically flat surface;

coating the optically flat surface of the master preform with a reflective layer;

providing a master, multifaceted polygonal fixture comprising pairs of upper and lower facet members defining planes for locating the reflective surfaces;

mounting the polygonal base in the fixture such that each facet of the base is located below a plane formed by a pair of upper and lower facet members of the fixture;

coating a facet of the base with an adhesive;

locating the reflective layer over the adhesive-coated facet by placing the coated master preform on the pair of upper and lower facet members of the fixture which are associated with the adhesive-coated facet of the base, the adhesive being contacted and displaced by the reflective layer on the master preform;

hardening the adhesive; and removing the master preform from the reflective layer so as to leave the reflective layer integrally bonded to the facet of the polygonal base at the precise angle desired.

2. A method as claimed in claim 1, characterized in that:

each flat master preform comprises a flat glass substrate having an optically polished surface; and the reflective layer comprises a parting layer which is reflective at least where the layer contacts the polished surface of the preform.

3. A method as claimed in claim 2, characterized in that the parting layer comprises a reflective layer of gold on the polished glass surface, a layer of platinum on the gold layer, and a layer of nickel on the platinum layer.

4. A method as claimed in claim 1, 2, or 3, characterized in that the multifaceted polygonal base is produced by casting and by machining so that each surface is set approximately at the required angle and is approximately flat.

5. A method as claimed in claim 4, characterized in that after the polygonal base and the master preform are mounted on the fixture, the coating on the master preform is separated from the associated facet of the base by a gap of from 0.5 mm to 0.15 mm, said gap being sufficient to take up the difference in the angle between the coating and the facet.

6. A method as claimed in claim 5, characterized in that the adhesive is a liquid thermosetting resin comprising an epoxy bisphenol A and the liquid resin is applied to at least one facet of the polygonal base, the liquid resin being displaced to cover the facet and to fill the gap, excess liquid resin being removed prior to allowing the resin to harden and prior to dismantling the assembly.

* * * * *